Patented Apr. 15, 1941

2,238,586

UNITED STATES PATENT OFFICE 2,238,586

REMOVAL OF PHOSPHORUS FROM ORES

Charles V. Foerster, Santa Cruz, Calif.

No Drawing. Application May 13, 1940,
Serial No. 334,895

6 Claims. (Cl. 75—1)

This invention relates, as indicated, to the removal of phosphorus from ores, but has reference more particularly to the treatment of iron ores for this purpose.

Attempts have heretofore been made to remove phosphorus from iron ores, by treatment of such ores with aqueous solutions of acids such as hydrochloric, nitric, and sulphuric acids. Such attempts have failed in most instances, either because the phosphorus was so well enclosed in the ores as to resist attack by the acids, or because the strength of the acid solution was not maintained throughout the leaching treatment, the acid becoming so diluted as to permit the precipitation of phosphates of such elements as iron, aluminum, etc., resulting in recontamination of the ore. In the case of titaniferous ores, titanium phosphate is precipitated, which is insoluble in even fairly strong concentrations of acids.

I have discovered that by adding small quantities of hydrogen peroxide to the acid leaching solution in the treatment of ores containing iron, titanium and phosphorus, I am able to prevent the precipitation of titanium phosphate.

I have tested the method on a number of titaniferous magnetites, with excellent results.

A typical case was the treatment of an ore containing 65% iron, 5% titanium and .08% phosphorus. In the treatment of this ore, aqueous solutions of hydrochloric acid containing HCl in amounts of from about 2% to about 10% by volume were used, and the phosphorus in the ore was lowered to .03% after leaching for two days. When an acid solution containing 2% by volume of HCl was employed, the acid had to be renewed during the leaching treatment. The addition of hydrogen peroxide reduced the phosphorus to .020%. During the leaching 0.5% of the ore was dissolved, but 20% of the solute was P2O5, thus indicating that the process is a commercially sound one for the removal and recovery of phosphorus.

In another case, the ore, which was brought from a locality far distant from that from which the ore in the first case came, contained 58.5% iron, 10% titanium dioxide, and .220% phosphorus. The concentration of the HCl in this case was 5%, and approximately 5 cc. of 30% hydrogen peroxide in 200 cc. of acid was added, with the result that the phosphorus was reduced to .060% within the leaching period of two days.

In any case, there is added to the acid as a minimum 1.2 parts by weight of 30% hydrogen peroxide for every part of titanium dioxide dissolved.

Instead of hydrogen peroxides, other peroxides, which form hydrogen peroxide in aqueous solution, such as sodium peroxide, potassium peroxide, barium peroxide, calcium peroxide, etc., may be used.

Instead of hydrochloric, other acids, such as nitric, sulphuric etc., may be used for the leaching solution.

I claim:

1. The process of treating iron ores containing titanium and phosphorus, which consists in subjecting the ore to leaching by means of relatively dilute acids in the presence of hydrogen peroxide, whereby phosphorus is dissolved from the ore and maintained in solution in the leaching agent.

2. The process of treating iron ores containing titanium and phosphorus, which consists of removing phosphorus from the ore by subjecting the ore to leaching by means of relatively dilute acids, to which hydrogen peroxide has been added in amounts sufficient to prevent precipitation of titanium phosphate.

3. The process of treating iron ores containing titanium and phosphorus, which consists in removing phosphorus from the ore by subjecting the ore to leaching by means of an acid of the group consisting of hydrochloric, sulphuric and nitric acids, to which hydrogen peroxide has been added in amounts sufficient to prevent precipitation of titanium phosphate.

4. A process as defined in claim 3 in which a minimum of 1.2 parts by weight of 30% hydrogen peroxide is added for every part of titanium dioxide dissolved.

5. The process of treating iron ores containing titanium and phosphorus, which consists in subjecting the ore to leaching by means of relatively dilute acids in the presence of a peroxide which forms hydrogen peroxide in aqueous solution, whereby phosphorus is dissolved from the ore and maintained in solution in the leaching agent.

6. The process of treating iron ores containing titanium and phosphorus, which consists in removing phosphorus from the ore by subjecting the ore to leaching by means of an acid of the group consisting of hydrochloric, sulphuric and nitric acids, to which a peroxide of the group consisting of hydrogen, sodium, potassium, barium and calcium, has been added in amounts sufficient to prevent precipitation of titanium phosphate.

CHARLES V. FOERSTER.